(12) United States Patent
Kummer et al.

(10) Patent No.: US 8,333,816 B2
(45) Date of Patent: Dec. 18, 2012

(54) MULTI-USE PERSONAL VENTILATION/FILTRATION SYSTEM

(75) Inventors: Joseph Kummer, Fayetteville, NY (US); Jimmie B. Allred, III, Skaneateles, NY (US)

(73) Assignee: Propulsive Wing LLC, Elbridge, NY (US)

( * ) Notice: Subject to any disclaimer, the term of this patent is extended or adjusted under 35 U.S.C. 154(b) by 419 days.

(21) Appl. No.: 12/701,818

(22) Filed: Feb. 8, 2010

(65) Prior Publication Data

US 2010/0175556 A1 Jul. 15, 2010

Related U.S. Application Data

(63) Continuation-in-part of application No. 12/237,885, filed on Sep. 25, 2009, now Pat. No. 7,892,306.

(60) Provisional application No. 60/975,377, filed on Sep. 26, 2007, provisional application No. 61/150,907, filed on Feb. 9, 2009.

(51) Int. Cl.
*B01D 39/00* (2006.01)
(52) U.S. Cl. .......... 55/356; 55/385.6; 55/467; 55/467.1; 55/471; 96/222; 96/417; 417/313; 415/53.3
(58) Field of Classification Search .................... 55/356, 55/385.6, 467, 467.1, 471, 473, 482; 96/222; 96/417; 417/313; 415/53.1, 53.3
See application file for complete search history.

(56) References Cited

U.S. PATENT DOCUMENTS

| | | | |
|---|---|---|---|
| 5,094,586 A | 3/1992 | Takada et al. | |
| 5,564,124 A | 10/1996 | Elsherif et al. | |
| 5,667,564 A | 9/1997 | Weinberg | |
| 5,861,127 A | 1/1999 | Yeh | |
| 6,773,477 B2 * | 8/2004 | Lindsay | 55/385.3 |
| 6,910,961 B2 | 6/2005 | Niu | |
| 6,929,684 B2 | 8/2005 | Chang et al. | |
| 7,463,487 B2 | 12/2008 | Kim | |
| 2004/0184949 A1 | 9/2004 | McEllen | |
| 2008/0281472 A1 | 11/2008 | Podgorny et al. | |

FOREIGN PATENT DOCUMENTS

WO 2006/094778 A1 9/2006

OTHER PUBLICATIONS

Exhausto Personalized Ventilation. Personalized Ventilation: A Healthy Investment, Exhausto Brochure, Jun. 2008.
Alamio Personal Air Purifier. http://purifymyair.com/alamio-personal-air-purifier.htm. at least as early as Apr. 2004.

(Continued)

*Primary Examiner* — Robert A Hopkins
(74) *Attorney, Agent, or Firm* — Brown & Michaels, PC

(57) ABSTRACT

A ventilation device uses a cross-flow fan and one or more filters, where the filter preferably has a J-shape that at least partially surrounds the rotor of the cross-flow fan. In one embodiment, the filter includes a plurality of pleats, preferably along a bottom surface of the filter. The filters preferably remove particles, undesired gases, and micro-organisms. A filtration and ventilation system with at least one first ventilation device and at least one second ventilation device larger than the first ventilation device, as well as a method of filtering contaminants out of air using a personal ventilation device, are also disclosed.

28 Claims, 15 Drawing Sheets

OTHER PUBLICATIONS

Honeywell HFD-217 and 219 Quietclean Tower Air Purifier. http://www.quietcleanair.com/ProductFeatures.aspx. at least as early as 2007.

Germ Guardian PS-100 Personal Air Purifier, http://www.germguardian.com/prod_persair_howitworks.asp. at least as early as Nov. 2007.

AirTamer Travel Air Purifier Model A-300. http://www.filterstream.com/us/index.phpp=products&do=showdetail&id=18. at least as early as Oct. 2006.

Wein Mini-Mate Air Supply Purifier. http://www.weinproducts.com. 1998.

Ionmax Personal Ionic Air Purifier, Andatech personal air purifier. http://www.andatech.com.au/catalog/personal-ionic-purifier-p-501.html. 2005.

Oreck XL Tabletop Air Purifier. http://www.oreck.com/air-purifiers/xl_air_purifier_tabletop_pro.cfm?tab=readmore. 2002.

Honeywell User Manual for Honeywell Model Series 120 Oscillating IFD Tower Air Purifier. 2005.

Faulkner, David et al., "Ventilation Efficiencies of Desk-Mounted Task/Ambient Conditioning Systems," Indoor Air, vol. 9, No. 4, 1999, pp. 273-281.

Podgorny, Marek et al., "Open Web Services-based Indoor Climate Control System," Proceedings of Clima 2007 WellBeing Indoors. 2007.

Melikov et al., "Personalized Ventilation: Evaluation of Different Air Terminal Devices," Energy and Buildings, vol. 34, 2002, pp. 829-836.

Sideroff, Chris and Dang, Thong, "Computation of Transport in PME: I. Flow and Pollutant Transport," Strategically Targeted Research in Intelligent Built Environmental Systems, SAC Review, Aug. 2007.

Niu, Jianlei et al., "Experimental Study on a Chair-Based Personalized Ventilation System," Building and Environment, vol. 42, 2007, pp. 913-925.

Kato, Shinsuke and Yang, Jeong-Hoon, "Study on Inhaled Air Quality in a Personal Air-Conditioning Environment Using New Scales of Ventilation Efficiency," Building and Environment, vol. 43, 2008, pp. 494-507.

Muhic, Simon and Butala, Vincenc, "Effectiveness of Personal Ventilation System Using Relative Decrease of Tracer Gas in the First Minute Parameter," Energy and Buildings, vol. 38, 2006, pp. 534-542.

Gao, Naiping and Niu, Jianlei, "CFD Study on Micro-Environment Around Human Body and Personalized Ventilation," Building and Environment, vol. 39, 2004, pp. 795-805.

Tainter, Nathan, Dannenhoffer, John, and Khalifa, H. Ezzat, "Personal Ventilation," SAC Review, Jul. 2006.

\* cited by examiner 120
122
Flow Direction 32
8
6

32
11
12
14
7
15
9

MULTI-USE PERSONAL VENTILATION/FILTRATION SYSTEM

REFERENCE TO RELATED APPLICATIONS

This is a continuation-in-part of copending application Ser. No. 12/237,885, filed Sep. 25, 2008, entitled "MULTI-USE PERSONAL VENTILATION/FILTRATION SYSTEM", which claimed one or more inventions which were disclosed in Provisional Application No. 60/975,377, filed Sep. 26, 2007, entitled "Multi-Use Personal Ventilation/Filtration System". This application also claims one or more inventions which were disclosed in Provisional Application No. 61/150,907, filed Feb. 9, 2009, entitled "MULTI-USE PERSONAL VENTILATION/FILTRATION SYSTEM". The benefit under 35 USC §119(e) of the United States provisional applications is hereby claimed, and the aforementioned applications are hereby incorporated herein by reference.

BACKGROUND OF THE INVENTION

1. Field of the Invention

The invention pertains to the field of ventilation systems. More particularly, the invention pertains to ventilation and filtration systems for personal use.

2. Description of Related Art

Allergens and other contaminants (e.g. pollen, mold, car exhaust, and smoke) in public places cause discomfort for many people. It is well established that poor quality of breathed air in the workplace results in reduced productivity at work. Air quality is also poor on airplanes, and travelers are often exposed to diseases from other passengers. Mold and toxins from cleaning products found in schools often cause problems with children, resulting in unhealthy learning environments due to heightened allergic sensitivity. In hospitals, airborne diseases can cause patients to develop nosocomial infections like tuberculosis, varicella, and rubeola.

With the problem of poor indoor air quality at an epidemic level, to the point that there is now such a thing as "Sick Building Syndrome," and with people spending the vast majority of their time inside, it is essential to find solutions that meet the needs of the millions of people who suffer due to transmitted diseases and allergic reactions to airborne pollutants. Several companies currently offer personal air ventilation and room air purifications devices, ranging from small units that one wears around the neck (e.g. Wein Personal Air Purifier and Ionmax Personal Ionic Air Purifier), to tabletop models (e.g. Oreck XL Tabletop Air Purifier), to free-standing floor models that filter the air for an entire room (e.g. Oreck XL Tower Air Purifier, Sharper Image Ionic Breeze, Hamilton Beach TrueAir HEPA air purifier).

Conventional air purification devices perform well to reduce the ambient levels of contaminants in a room; however, they fail to adequately filter the air as it travels from the floor to the mouth. As a result, significant contaminants, both particulate and gaseous, have an opportunity to enter the airstream in this region, greatly reducing the perceived effect of the room air purifier. Introduction of contaminants into the thermal plume include resuspension of particulate matter from the floor (particularly from dirty carpeting), volatile organic compound outgassing from carpets, furniture, and equipment, as well as ambient levels of both particles and volatile organic compounds. Thermal plume, as defined herein, is a plume generated by gas rising from above a heat source because warm gas is less dense than the surrounding cooler gas.

To improve the indoor air quality, air filters have been widely used in building HVAC systems, portable room air cleaners and even automobiles. Particles are essentially the major target of these filters. Recently, with the increase in concern over other indoor pollutants including, but not limited to, volatile organic compounds, bacteria and other microorganisms, as well as other undesired gases and airborne pollutants, composite/combination filters have been developed that are aimed to remove pollutants other than particles.

There remains a gap in filtration systems when considering the needs of the individual, especially in terms of the personal environment. Large, bulky, floor models are effective in general removal of pollutants from a room; however, they tend to be noisy, expensive, and consume large amounts of power. At the other end of the spectrum, those that are wearable (i.e. the true personal ventilation unit for the individual), do not work well, and many release ozone as a bi-product of the filtration process, which is then breathed in by the user. In light of this, there is a need in the art for improved personal ventilation systems.

SUMMARY OF THE INVENTION

A ventilation device uses a cross-flow fan and one or more filters, where the filter preferably has a J-shape that at least partially surrounds the rotor of the cross-flow fan. In one embodiment, the filter includes a plurality of pleats, preferably along a bottom surface of the filter. The filters preferably remove particles, undesired gases, and micro-organisms. In one embodiment, the ventilation device is a personal ventilation device.

A filtration and ventilation system includes at least one first ventilation device and at least one second ventilation device for filtering contaminants out of air. Each of the first and second ventilation devices preferably include a cross-flow fan with a motor, a rotor having plurality of fan blades, and a cover surrounding the rotor and having an inlet and an outlet. Each of the ventilation devices also preferably include at least one air filter at least partially surrounding the rotor such that air that enters into the ventilation device passes through both the fan and the air filter before exiting the ventilation device. The first ventilation device is preferably a personal ventilation device that filters air from a thermal plume of the individual and the second ventilation device is substantially larger than the first ventilation device.

A method of filtering contaminants out of air uses a personal ventilation device comprising at least one air filter. The method includes the steps of drawing air from a thermal plume of a user into the personal ventilation device, filtering the air using the air filter in the personal ventilation device, and blowing the filtered air back toward the user.

DETAILED DESCRIPTION OF THE INVENTION

A compact, quiet, low power personal ventilation system delivers filtered air to the user. A personal device, as defined herein, is a device that filters/ventilates air for human or animal consumption.

A fan, as defined herein, is a device that accelerates air movement using impellers or blades rotating around an axis thereby directing air at an increased pressure.

Figure 3:
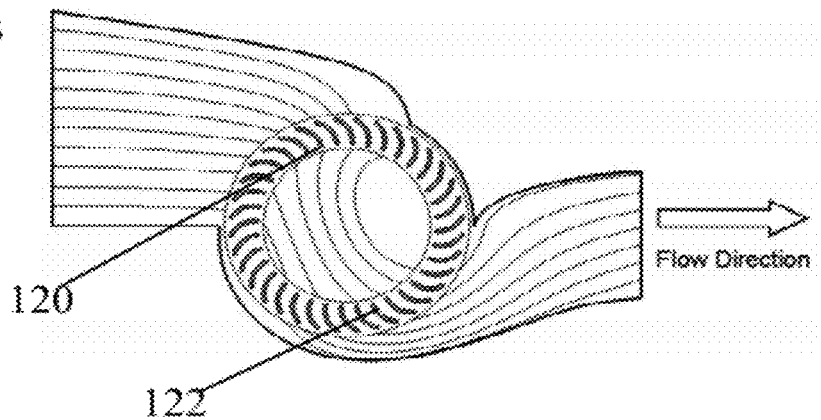
FIG. 3 shows streamlines within a cross-flow fan generated from a 2D unsteady CFD simulation.
Figure 4A:
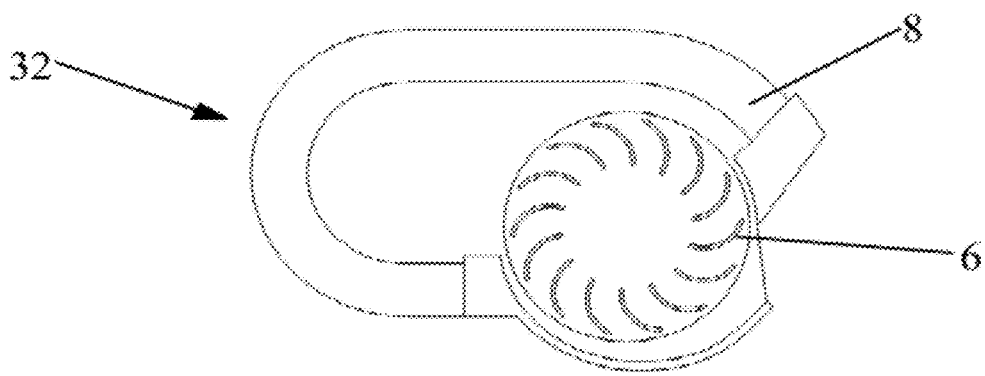
FIG. 4a shows a diagram of a ventilation device of the present invention.

Results from an unsteady 2D CFD simulation are shown in FIG. 3, and clearly show the radial path the flow takes. The ventilation device preferably uses a cross-flow fan, as shown in FIG. 4a. A 2-stage machine, the flow passes through the blades twice at 120 and 122, resulting in both high flow rate and a rise in pressure. By utilizing a "water-bottle" shaped blower unit, the shape of the fan and flow path create a compact, efficient device for personal ventilation use.

Solidworks CAD and Starccm+CFD software packages were used to simulate the personal ventilation device. In particular, using a "black-box" approach to simulate the personal ventilation device significantly reduced the meshing requirements and time to converge compared with a full unsteady simulation including the rotating fan. This permitted parametric studies on the flow external to the personal ventilation device.

These experiments looked at the flow around a simulated person working in an office. The personal ventilation device was included in the simulations. It was attached to the front of the laptop computer in order to draw in flow from the thermal plume, filter it, and exhaust the filtered air back toward the person in an effort to constitute as large of a portion of the breathed air as possible. The full personal ventilation device, including internal flow path and fan, was replaced with a simple inlet and outlet (i.e. only inlet and outlet boundary conditions were specified). By doing this, the grid count was reduced considerably. In addition, whereas an unsteady simulation is necessary when a rotating fan is present, for the case with a "black-box" personal ventilation device, the simulation becomes steady, thus reducing time to convergence.

Multiple sets of conditions were simulated, including having the personal ventilation device both off and on for the following outlet cases: a horizontal exit jet (0 degree case), 30° exit jet incline (measured from the horizontal), and 45° exit jet. For each outlet angle setting, the exit flow was simulated at a velocity of 0.5 m/s and 1.0 m/s. Grid clustering was present near the person, laptop computer, and in the proximity of the personal ventilation device in order to adequately capture the exhaust jet.

Simulation setup included setting the surface temperature for both the person and computer, as well as the inlet and outlet boundary conditions for the personal ventilation device. With the personal ventilation device off, the simulations clearly showed the rising thermal plumes of the simulated person and laptop computer. Of particular note is the region just below the table and between the table and person. It is this air that travels up to the breathing zone. In order to effectively mitigate contaminants from the air that the person is breathing, this air must be filtered. The data confirmed that the majority of the breathed air originates from the floor. It travels up the person's lap, torso, and eventually passes their face. With the personal ventilation device turned off, a large portion of the flow actually passes directly over the personal ventilation unit when located at the front of the desk. This is of particular relevance, since it means that, in order to provide filtered air to the user, the natural flow path of the air will not need to be altered, reducing the necessary energy input considerably when compared to a system that aims to drastically change the flow patterns near the person.

The flow entering the breathing zone originates near the floor and is significantly influenced by the individual's thermal plume. Placing the personal ventilation device in the natural flow path of this buoyant air, taking it in and filtering it, and then exhausting the air back toward the individual results in an efficient means to deliver clean air without any external air source (for example, a central air supply). There is an optimum combination of outlet flow angle and outlet velocity for delivery of the filtered air to the breathing zone. If the angle is set too low and velocity too high, the momentum in the flow carries it through the thermal plume and past the person. By comparison, at a high angle and low velocity the air is unable to penetrate the thermal plume and instead is convected upward before reaching the face. A preferred range for delivery of fresh air to the individual's breathing zone is a personal ventilation outlet air velocity between 0.5 m/s and 1.0 m/s and exhaust angle between 30 and 45 degrees from horizontal.

A primary concept in the personal ventilation/filtration device of the present invention utilizes the natural convection caused as a result of the buoyant flow near a person. Two good examples of this are a person sitting at a desk in an office or on an airplane. In these environments, the ambient air temperature is typically much lower than the temperature of the individual's skin. As a result, the air near a person is warmed, and subsequently begins to rise due to buoyancy effects. After only a few minutes, a stable column of vertically rising air forms, termed the human thermal plume.

Figure 1:
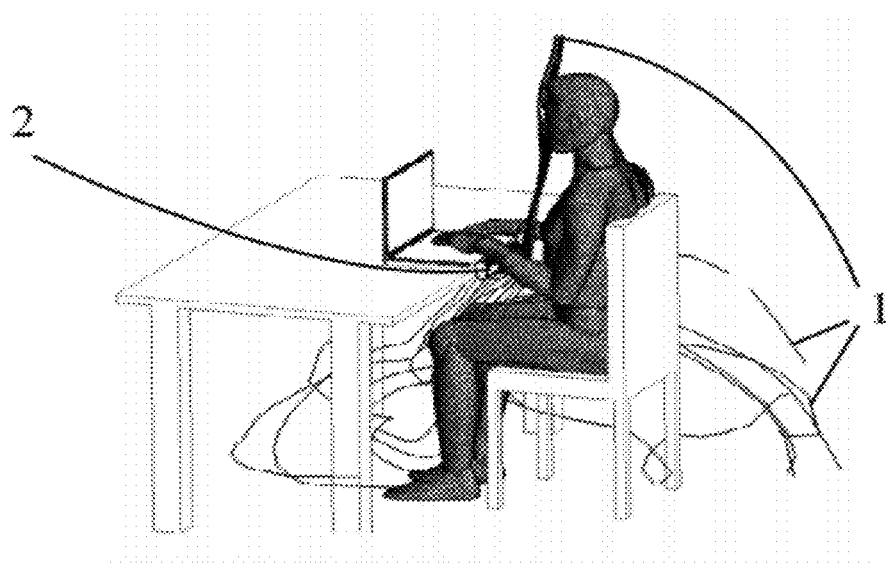
FIG. 1 shows streamlines around a person working at a desk.

FIG. 1 shows a person working at a desk and the representative air streamlines 1, or lines of thermal plume. Of particular importance to the present invention is the fact that the air passing the individual's face (i.e. the breathed air), does not come from in front of the person (i.e. from the room in general), but instead originates at the floor near the person's feet, travels up their lap, past their torso, and to the mouth.

Figure 2A:
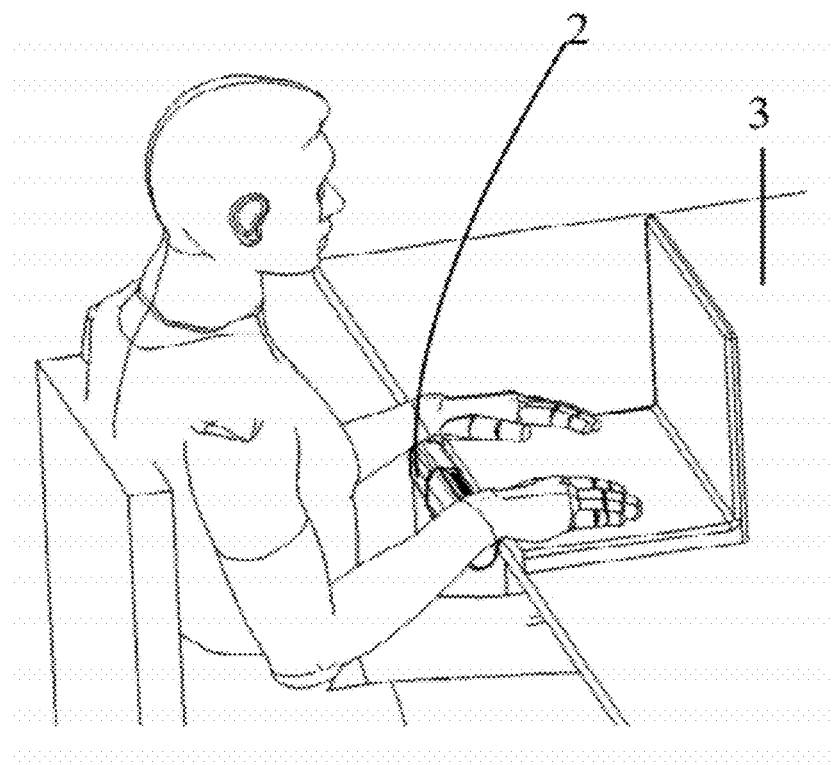
FIG. 2a shows a ventilation device of the present invention mounted on the front of a desk.
Figure 2B:
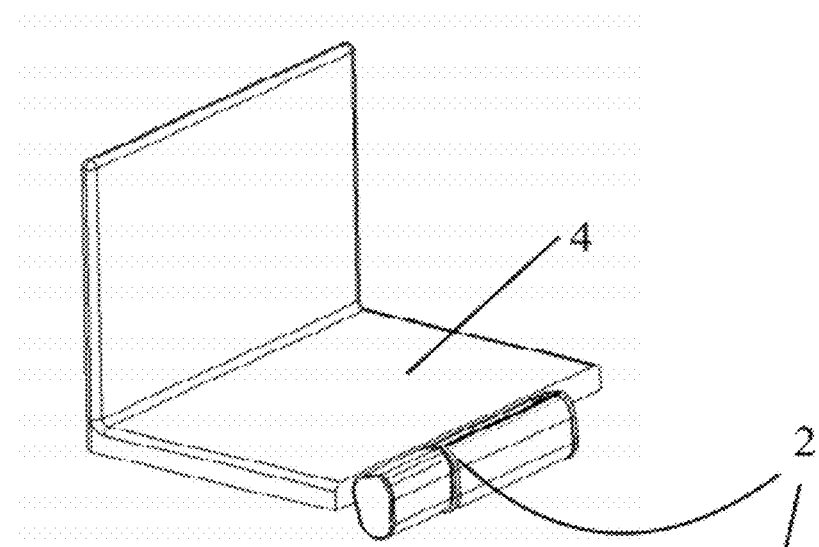
FIG. 2b shows a view of a ventilation device of the present invention mounted on the front of a laptop computer.
Figure 2C:
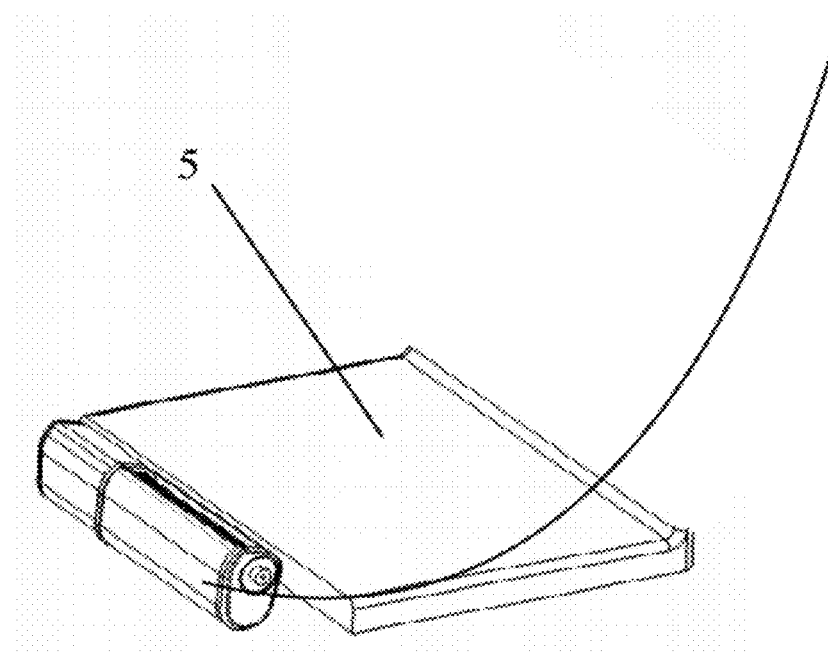
FIG. 2c shows a view of a ventilation device of the present invention mounted to the front of a serving tray on an airplane.
Figure 5:
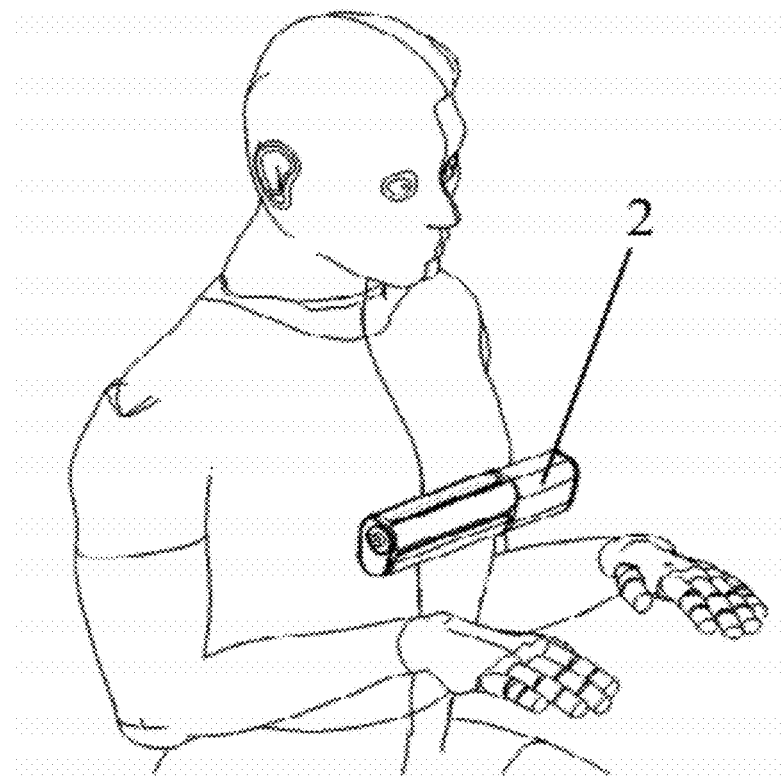
FIG. 5 shows a person wearing a ventilation device of the present invention.

This invention addresses the need for a compact, efficient, personal filtration device 2 to remove the contaminants present in the thermal plume before reaching the face. Some preferable mounting positions for the personal ventilation device are shown in FIGS. 2a-2c and include, but are not limited to, the front of a desk 3, the front of a laptop computer 4, or the serving tray 5 on an airplane or on a hospital bed. Other examples of applications include attaching the personal filtration device 2 to the steering column of a car and, in hospitals, on patients with compromised immune systems. FIG. 5 shows a user wearing a personal ventilation device 2 of the present invention.

Figure 4B:
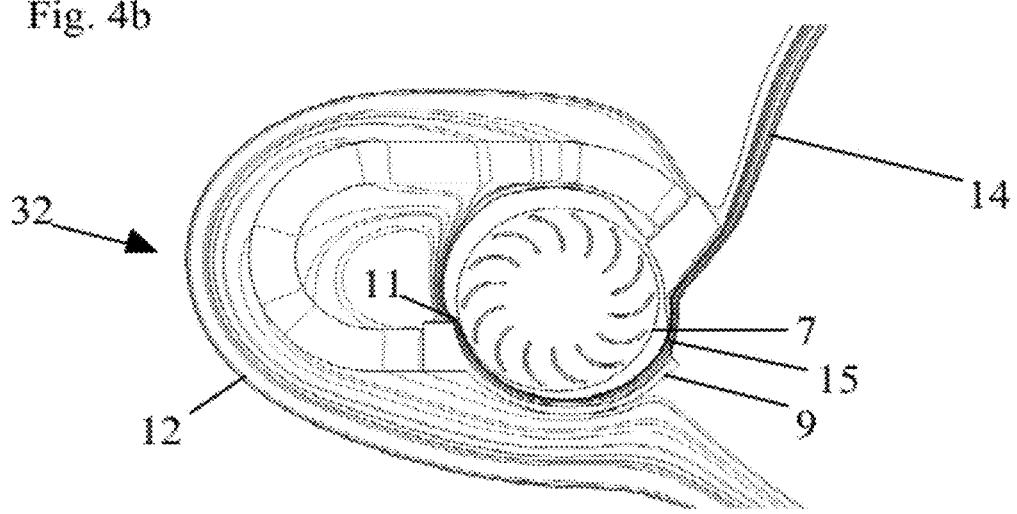
FIG. 4b shows a diagram of the flow path of a ventilation device of the present invention.

One embodiment of the personal filtration device 32 is shown in FIG. 4a and FIG. 4b. In this design, the cross-flow fan 6 and filter system 8 work in tandem to draw in air from the thermal plume 12, filter it, and then expel the air stream 14 to provide the breathed air to the individual.

The cross-flow fan 6 includes a rotor 7, a motor 46 (shown in FIG. 10b) and a cover 9 that surrounds the rotor 7 and has an inlet 11 and an outlet 15. The majority of the air breathed in by the individual will first be processed by the personal ventilation device 2, which will filter out a wide range of contaminants (e.g. gaseous, particulate, and micro-organisms). Proper intake of the thermal plume, and re-delivery of the filtered air to the user, provides a significant reduction in exposure to pollutants.

Figure 14:
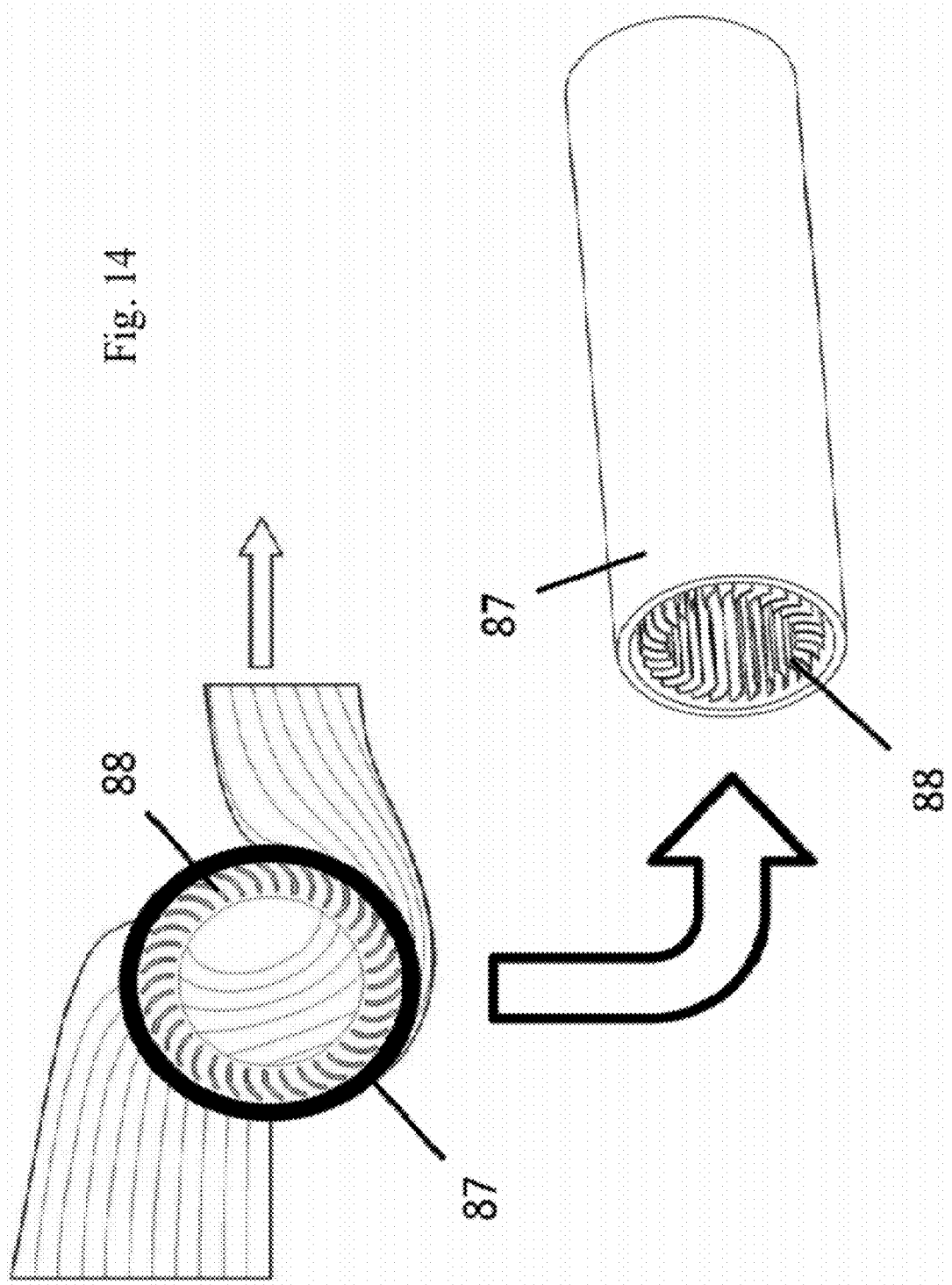
FIG. 14 shows an embodiment of the ventilation device, where the filter completely surrounds the fan.

FIG. 14 shows another embodiment of a personal ventilation device of the present invention that could be used in a personal ventilation device. The filter 87 in this figure fully surrounds the fan 88.

The filter(s) in the embodiments of the present invention may include any filter that effectively filters particles and/or other pollutants, including, but not limited to, volatile organic compounds (VOCs), microorganisms, and other undesired gases and airborne pollutants.

In one embodiment, the filter is preferably attached to a support structure such that the filter radially surrounds the fan, thereby forming a filter cartridge 33. In other embodiments, the fan can surround the filter segment depending on the fan configuration. In still other embodiments, the filter cartridge is shaped for the desired application without utilizing a fan for air movement.

Figure 6:
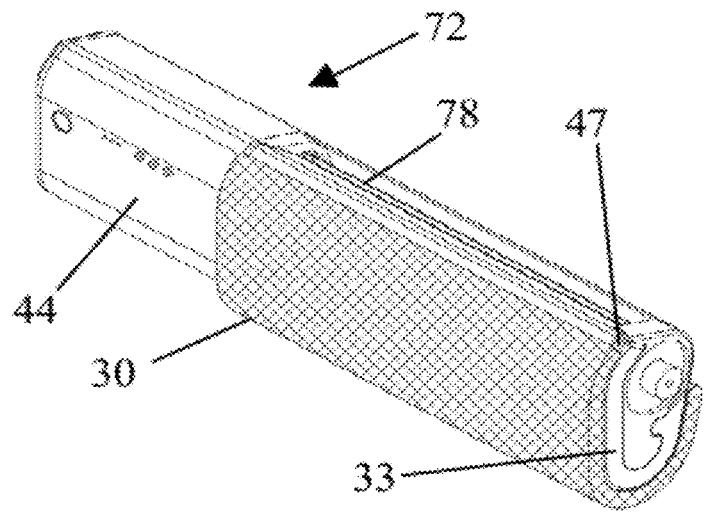
FIG. 6 shows a close-coupled heat-exchanger/filtration unit of the present invention.
Figure 7A:
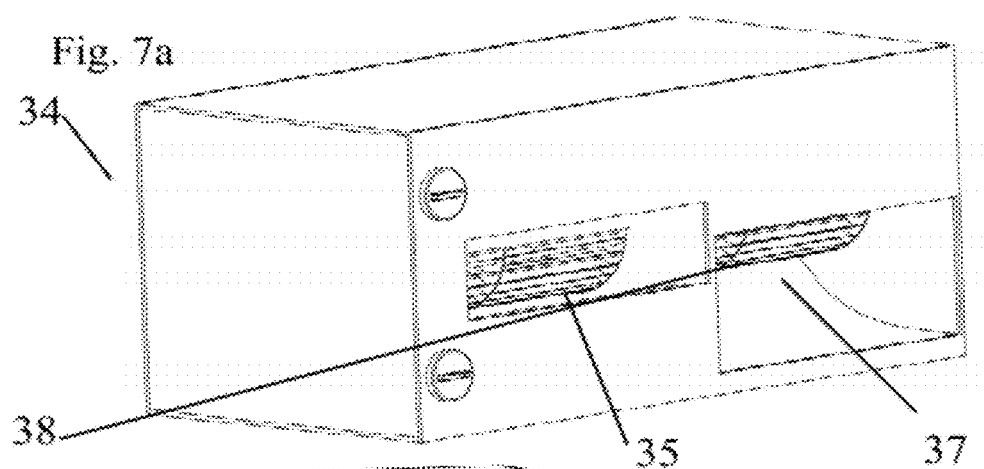
FIGS. 7a and 7b show perspective views of a ventilation device of the present invention using a segmented cross-flow fan.
Figure 7B:
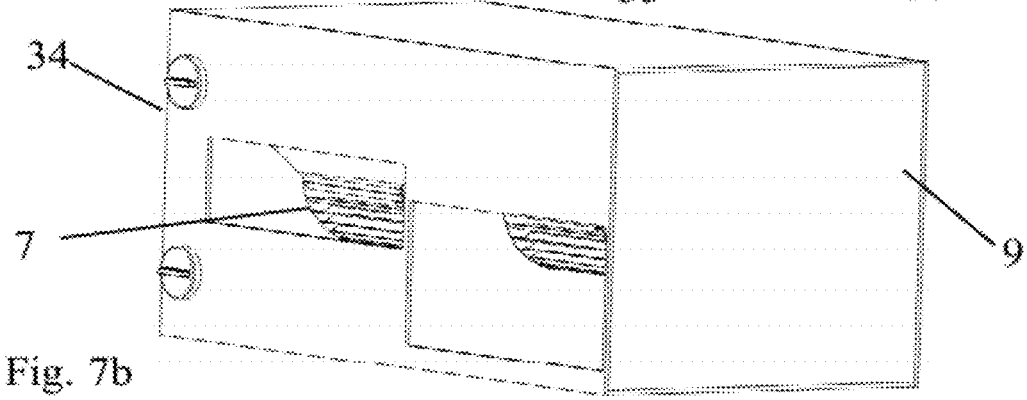
Figure 7C:
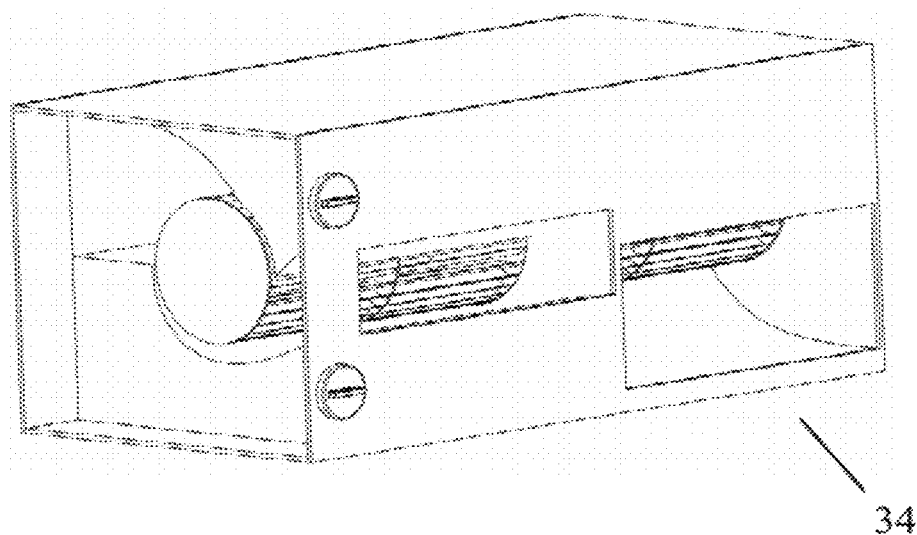
FIGS. 7c and 7d show perspective views of a ventilation device of the present invention using a segmented cross-flow fan from FIGS. 7a and 7b respectively, with the end cover removed.
Figure 7D:
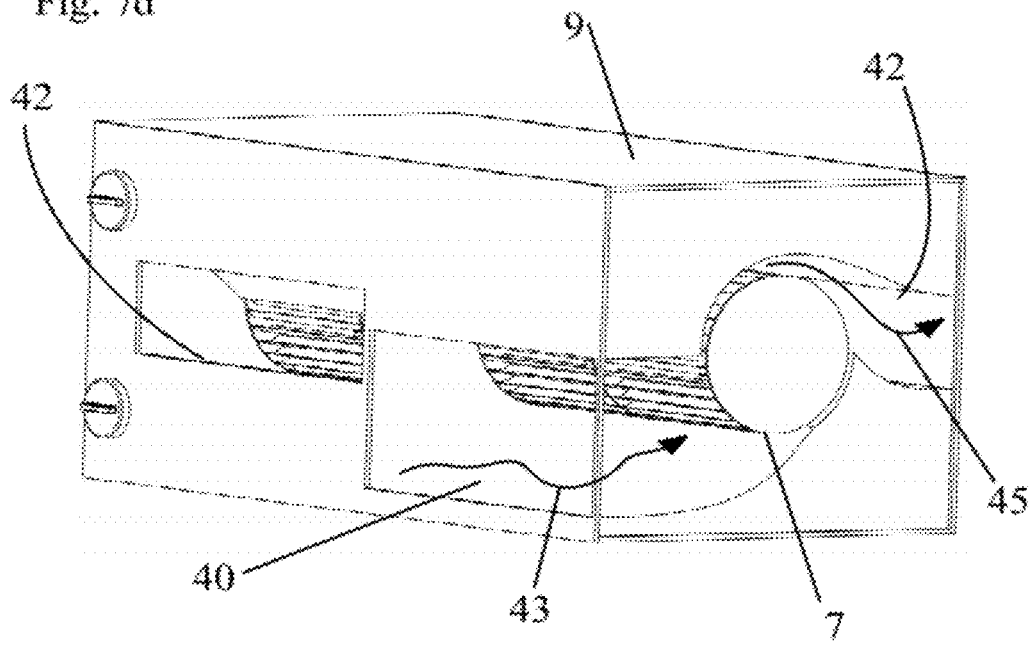

Another embodiment of a personal ventilation device 72 is shown in FIG. 6. This embodiment includes a filter 47 that is radially fitted around a fan 78 attached to a fan housing 44 and coupled to a power supply unit. The diameter of the fan 78 and overall length of the personal ventilation device 72 is determined by the intended application of the device and the area of the airspace to be filtered.

In FIG. 6, the filter 47 is fitted with a heat exchanger 30 such that the filtered air can be warmed or cooled for larger scale Heating Ventilation and Cooling (HVAC) units. Combining a heat exchanger with the filter and fan described herein creates a compact device in applications where minimum space is a design criteria. Since pressure losses in heat-exchangers are well known and easily calculated, such a system is easily designed by combining the resistances of the heat-exchanger and filter.

Figure 9:
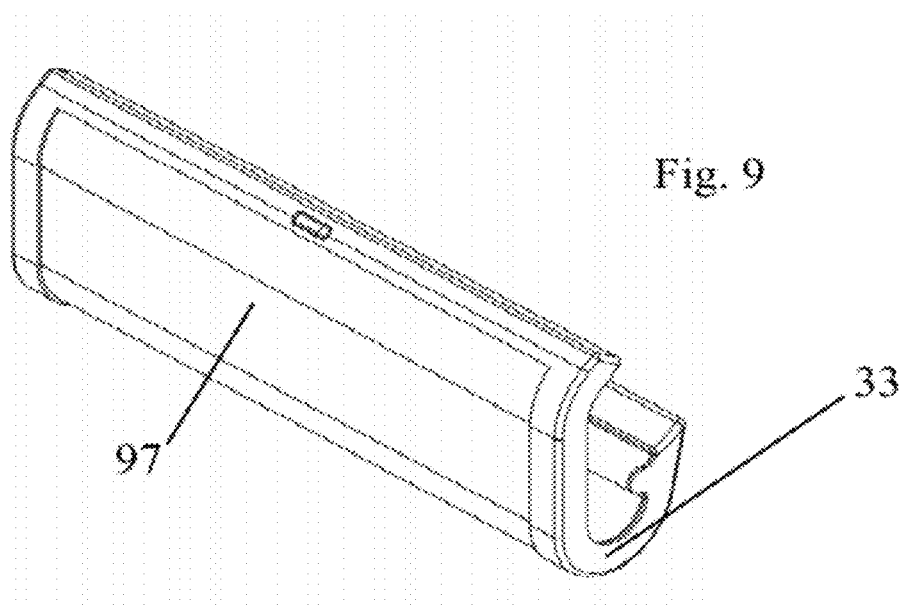
FIG. 9 shows a perspective view of a detached filter segment.
Figure 10A:
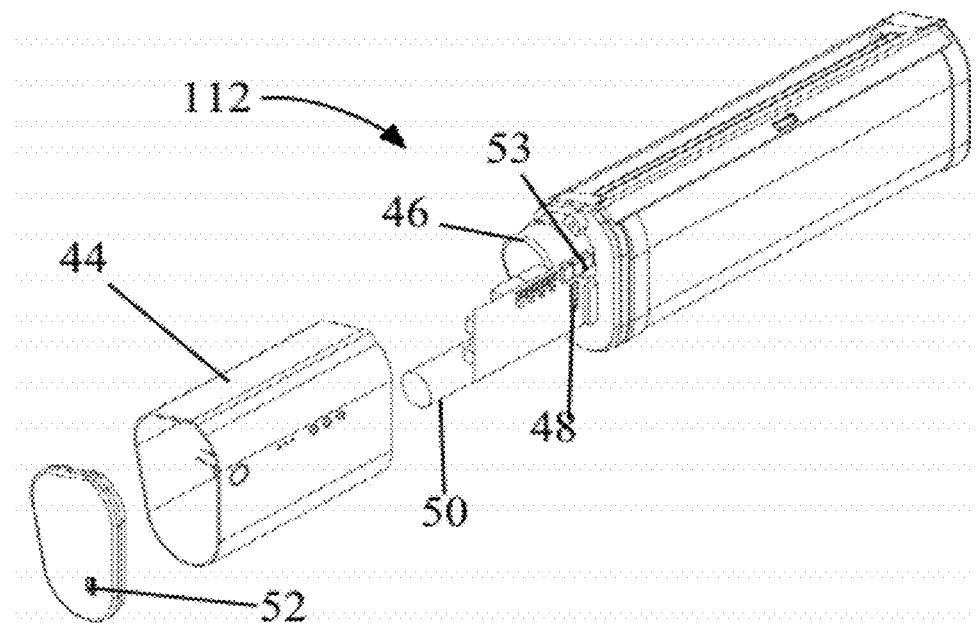
FIG. 10a shows a ventilation device in perspective view with the power supply segment disassembled.
Figure 10B:
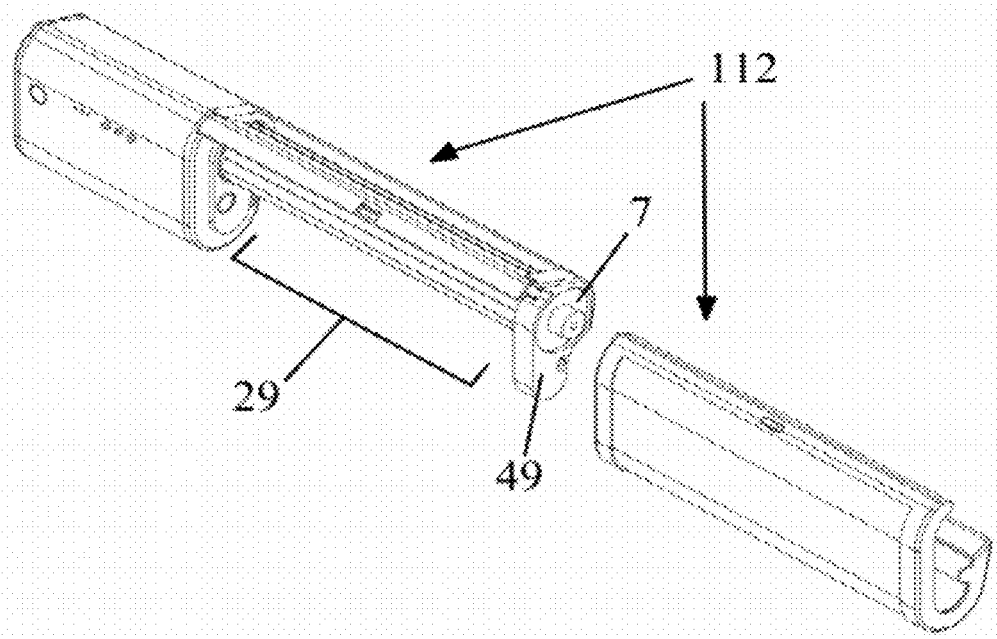
FIG. 10b shows a ventilation device in perspective view with the filter detached from the device.

One embodiment of the personal ventilation device 72 is designed with a filter cartridge 33 that is elongated, as shown in FIGS. 6, 9, and 10b. As shown in these figures, the filter cartridge has a partial elliptical, substantially J, or hook shape. Because the orbit of fans are usually circular, the filter can be elongated, having a more flattened or elliptical shape. This allows the filter to have more surface area than a perfect cylinder, but remain compact relative to the fan 78.

For ventilation systems where additional filtering surface area is desired, the filter cartridge 33 can wrap around the bottom and back-side of the fan. This allows for a smaller unit with equal or greater filtering capabilities than filters with a flat surface geometry. In FIGS. 10a and 10b, the filter in the personal ventilation device 112 is oriented such that exhausted air is filtered in a single stage. The ventilation device can alternatively be configured to filter air in multiple stages. For example, the filter 87 can completely surround the fan chamber 29 such that both air drawn in and exhausted by the fan 88 passes through the filter 87 while maintaining a high flow rate, as shown in FIG. 14. Alternatively, additional filters can be stacked if additional layers increasing the filtering capability are desired.

Figure 15A:
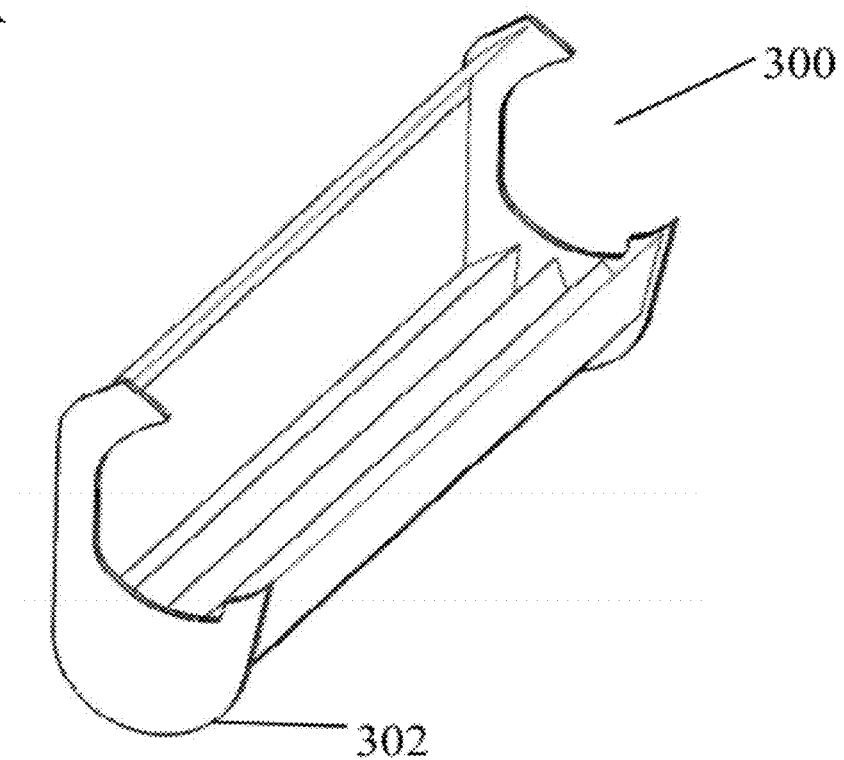
FIG. 15a shows a J-shaped filter with a flat front side and large pleats on the bottom curve.
Figure 15B:
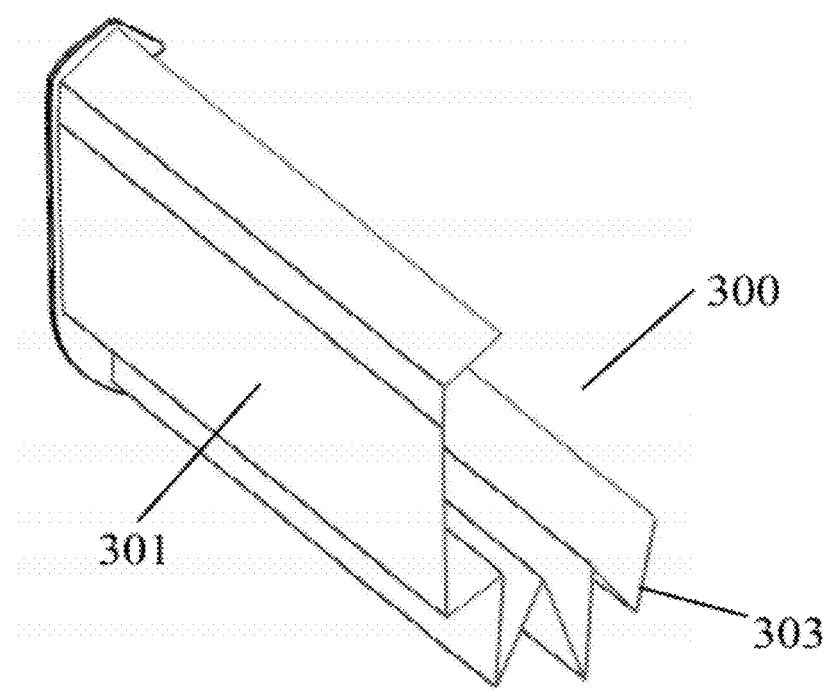
FIG. 15b shows another view of FIG. 15a, where the side support is hidden to show the shape of the filter.

In another embodiment of the present invention, a J-shaped filter 300 with variable pleat depth is used. In the example shown in FIGS. 15a and 15b, the front side 301 of the filter 300 has no pleats. The front side 301 could alternatively have small pleats. Large pleats 303 are preferably used on the bottom curve 302 of the J-shape. The J-shape filter 300 allows large pleats 303 along the bottom curve 302. Since this shape off-sets the bottom of the filter from the fan, it leaves an empty space within the fan housing chamber. An advantage of this design is it significantly increases filter surface area, which decreases the pressure drop through the filter, greatly increasing the airflow rate.

In a preferred embodiment of the present invention, the fan is a radially mounted, segmented cross-flow fan 34, as shown in. FIGS. 7a-7d. In conventional prior art configurations, air flows in through one inlet and out of one outlet, and hence flows only in one direction. In contrast, the segmented cross-flow fan 34 is divided into two segments 35, 37 by a divisional wall 38 such that each segment 35, 37 of the fan 34 connects to a common axle. While only two segments 35, 37 are shown in this figure, the device may have three or more segments without deviating from the spirit of the present invention. The inlet channels 40 and output channels 42 are shaped internally (not shown) such that when the segmented cross-flow fan 34 rotates, air is exhausted through the output channels 42 in any specified direction even though the fan only rotates in one direction. The air coming in and the air coming out are depicted by arrows 43 and 45, respectively, in FIG. 7d.

The internal housing is designed such that, through any individual fan segment, the flow path is fabricated to promote airflow in either direction. That is, the inlet and outlet of the unit is defined by the internal flow path structure. An advantage of the segmented, cross-flow fan 34 is that, by using only one fan spinning in a single direction, multiple airflow paths can be setup, whereby the air is flowing in several different directions.

Figure 8A:
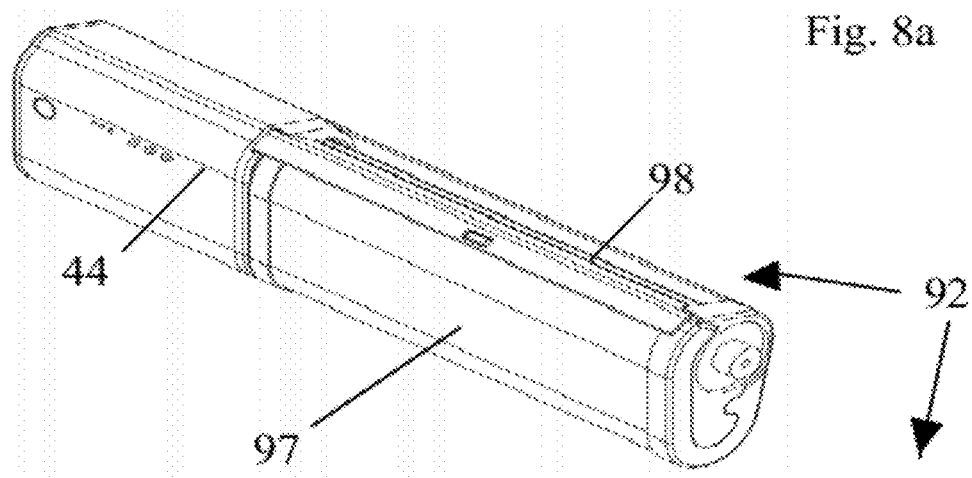
FIGS. 8a and 8b show perspective views of a personal ventilation device.
Figure 8B:
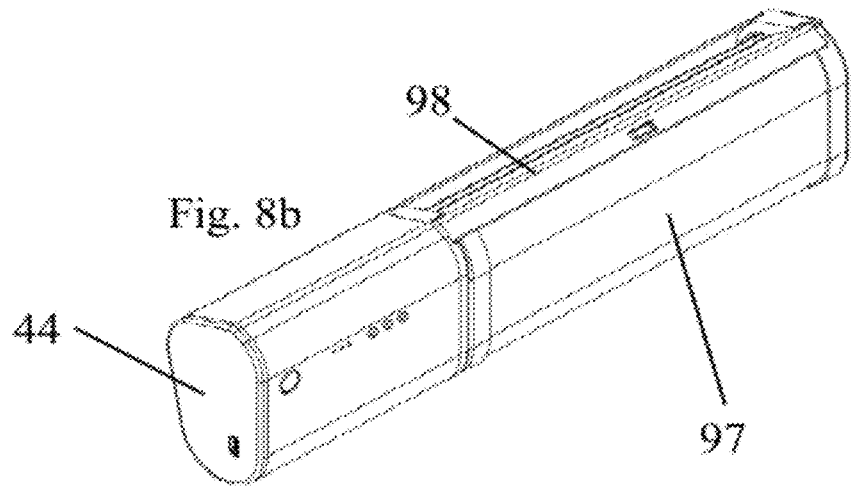

FIGS. 8a, 8b, and 9 show another preferred embodiment of a personal ventilation device 92 with the filter 97 attached to the fan housing 44 (FIGS. 8a and 8b) and the filter by itself (FIG. 9). The fan housing 44 includes the fan 98 that is supported at one end by an end plate 49. The fan is coupled to a motor 46 as shown in FIGS. 10*a* and 10*b*. The motor 46 preferably attaches electrically or mechanically to a control unit interface 48. The fan housing 44 includes a power supply input jack 52 that electrically attaches to a power supply 50 that can recharge through a USB type connection. Alternatively, the power supply 50 can be charged or powered by alternate current and direct current connections. In one embodiment, a pulse-width modulation motor 46 is powered by the power supply 50 such that the control interface 48 allows the user to adjust settings for the ventilation device. Alternatively, the fan speed can be controlled by a standard linear controller. Manual control buttons 53 linked to the control interface 48 control the fan speed. Alternatively, the device can be modulated and monitored by software though a USB type connection. Multiple VOC and temperature sensors can be included and monitored simultaneously on either the computer or on a readout on the personal ventilation device.

Figure 11:
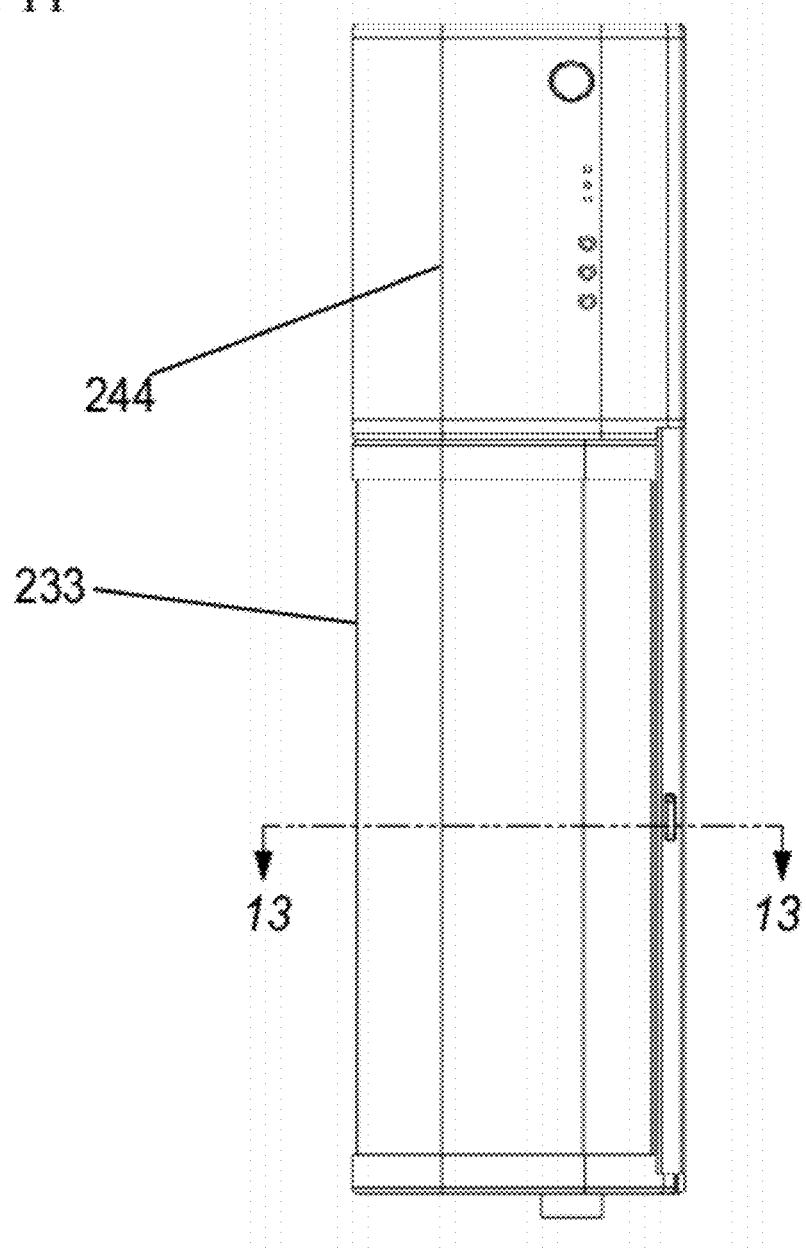
FIG. 11 shows a front view of a ventilation device of the present invention.
Figure 12:
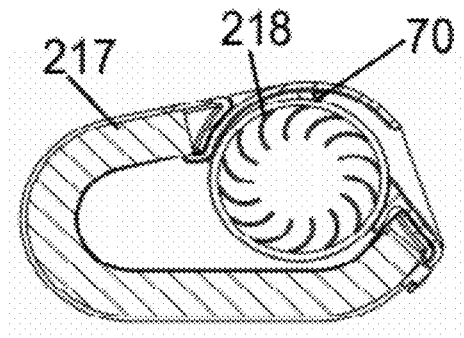
FIG. 12 shows a cross section of the ventilation device of FIG. 11.

In FIG. 11, a filter cartridge 233 is attached to a fan housing 244. FIG. 12 shows the filter 217 surrounding the fan 218 such that its elongated form yields greater surface area than if more closely conformed to the circular nature of the fan 218.

Figure 13A:
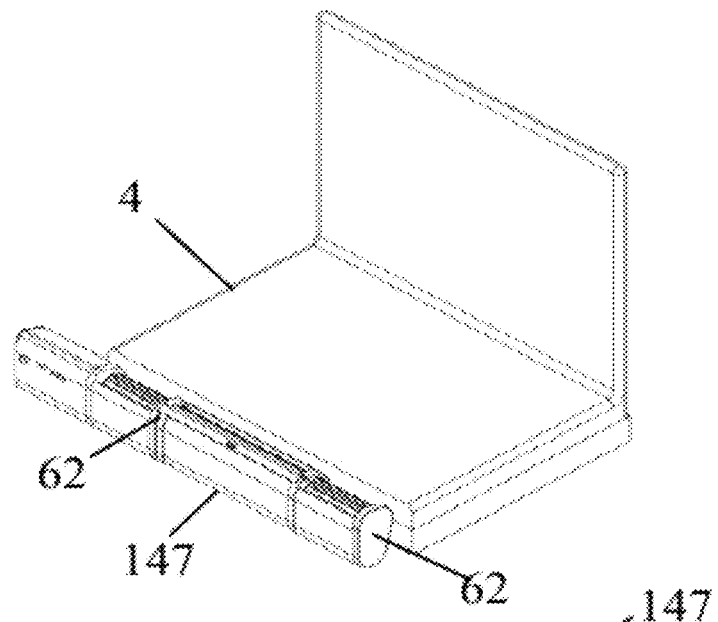
FIGS. 13a-13c shows perspective views of a ventilation device of the present invention having a segmented cross-flow fan and Peltier junction air cooler/warmer.
Figure 13B:
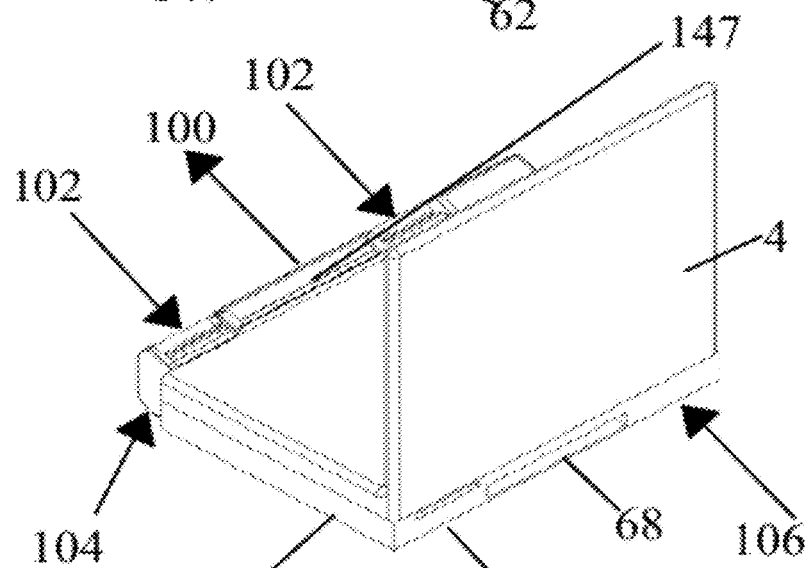
Figure 13C:
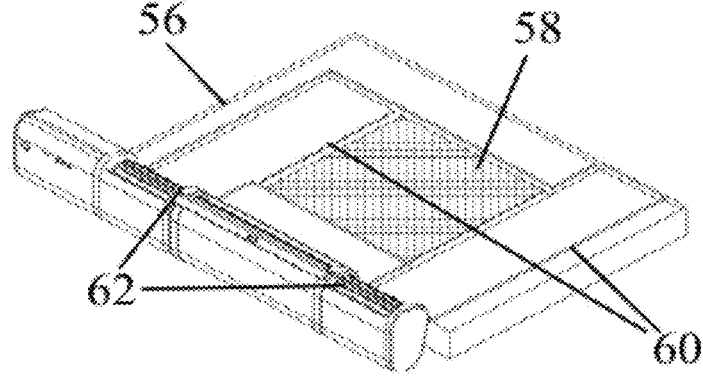

FIGS. 13*a*-13*c* show the ventilation device adapted to a laptop computer 4. In a preferred embodiment, the ventilation device is joined with a Peltier junction or thermoelectric cooling device 58. A case 56 holds the device 58. The Peltier junction 58 includes at least two electrically charged plates stacked on top of one another. The charged plates include a cold exchanger that absorbs warm temperature and a heat exchanger that dissipates warm temperature. Air flow channels 60 direct the warm air out the back of the laptop computer 4. This embodiment of the invention can be configured to include a filter 147, and fan segments 62 that adhere to the same principles shown in FIGS. 7*a*-7*d*.

The segmented cross-flow personal ventilation device includes a cross-flow fan that is divided into segments 62 such that warm air is convected away from the laptop 4 through vents 68, and cooler air is directed through the filter 147 simultaneously. Note that there is a segment 62 (not shown) of the fan surrounded by the filter 147 in the central portion of the device. Conversely, the airflow patterns can be reversed by altering the current of the Peltier junction such that the warm air is convected through the filter 147 toward the individual and cooler air is convected away from the laptop through the vents 68.

As shown in FIG. 13*b*, using a segmented cross-flow fan with fan segments 62 will allow, given only one fan, air to be delivered both toward 100 and away 102 from the individual. The air 104 from the thermal plume enters the center fan partition of the personal ventilation device. Through careful thermal-fluid management, this embodiment can provide cooled air 100 to the user, while simultaneously evacuating the warmed air 102 in the opposite direction, away from the user. In the back of the laptop computer 4, warm air 106 is pulled into the cooler unit, while hot air 108 is blown out the back of the unit. Ducting within the Peltier cooling unit, located under the laptop, brings chilled air into the center cross-flow fan, through the filter, and out to the individual. The outer fan sections 62 draw in air from the top in order to convect the heat generated from the Peltier junction and laptop out the back.

In one embodiment, when the personal ventilation device is plugged into a computer through a USB port, it can be controlled with a software interface. The software has the ability to play back sounds when the personal ventilation device is utilized. The system is preferably programmed on the computer to play sound files. For example, the software may allow playback of files including, but not limited to, .wav and .mp3 files. This embodiment allows the user to play soothing environmental sounds while utilizing the personal ventilation device, which enhances the user's experience.

In one embodiment, scented air fragrances may be added to the filtered air. In one example, scented fabric can be adapted to cover the exhaust layer of the filter thereby emitting a scent into the air. In another embodiment, the ventilation device can have injectors 70 (see FIG. 12) that emit a chemical into the air as it passes through the filter or at some point after the air passes through the filter.

Figure 16:
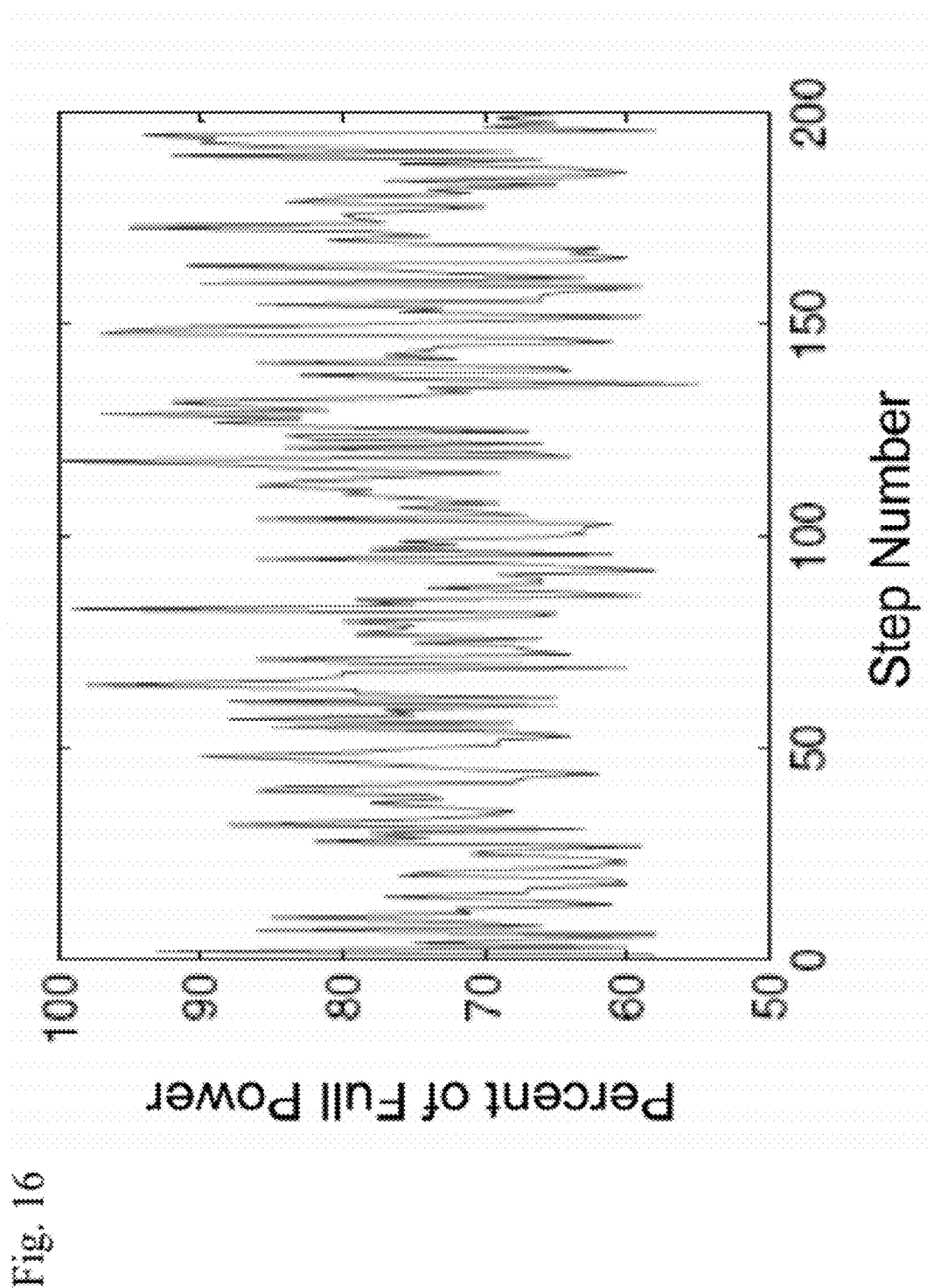
FIG. 16 shows a graph depicting the fluctuations in an example of breeze mode, where the fluctuations are pre-programmed into the control circuit board of the personal ventilation device.

Another embodiment provides a "breeze mode", which provides the user with a simulated breeze, as if sitting next to an open window. Breeze mode is preferably implemented into personal ventilation system hardware and/or software that modulates the fan revolutions per minute, and hence flow rate, to simulate the variations in natural wind. The breeze mode can be programmed as a random fluctuation, or pre-programmed into the control circuit board in the control unit interface 48 of the personal ventilation device. In one example of pre-programming the "breeze mode", approximately 200 set points are programmed into the control circuit board of the personal ventilation device. FIG. 16 shows a graph depicting the fluctuations in an example of breeze mode with 200 set points (step numbers) in a pattern that repeats. The vertical axis shows the fan speed as a percent of full power, which varies from set point to set point. This simulates a random fluctuation. While this example shows approximately 200 set points that repeat, other numbers of points or different percentages of power for each point could be alternatively used, depending upon the desired breeze variation desired. The breeze mode is preferably programmed into the personal ventilation device hardware (the circuit board), and the software enables and disables this feature with a button, which is preferably in the graphical user interface. One way for the user to activate or deactivate the breeze mode would be to depress the fans speed up and down buttons simultaneously. Alternatively, a separate button could be included on the personal ventilation device, which activates the breeze mode.

Figure 17A:
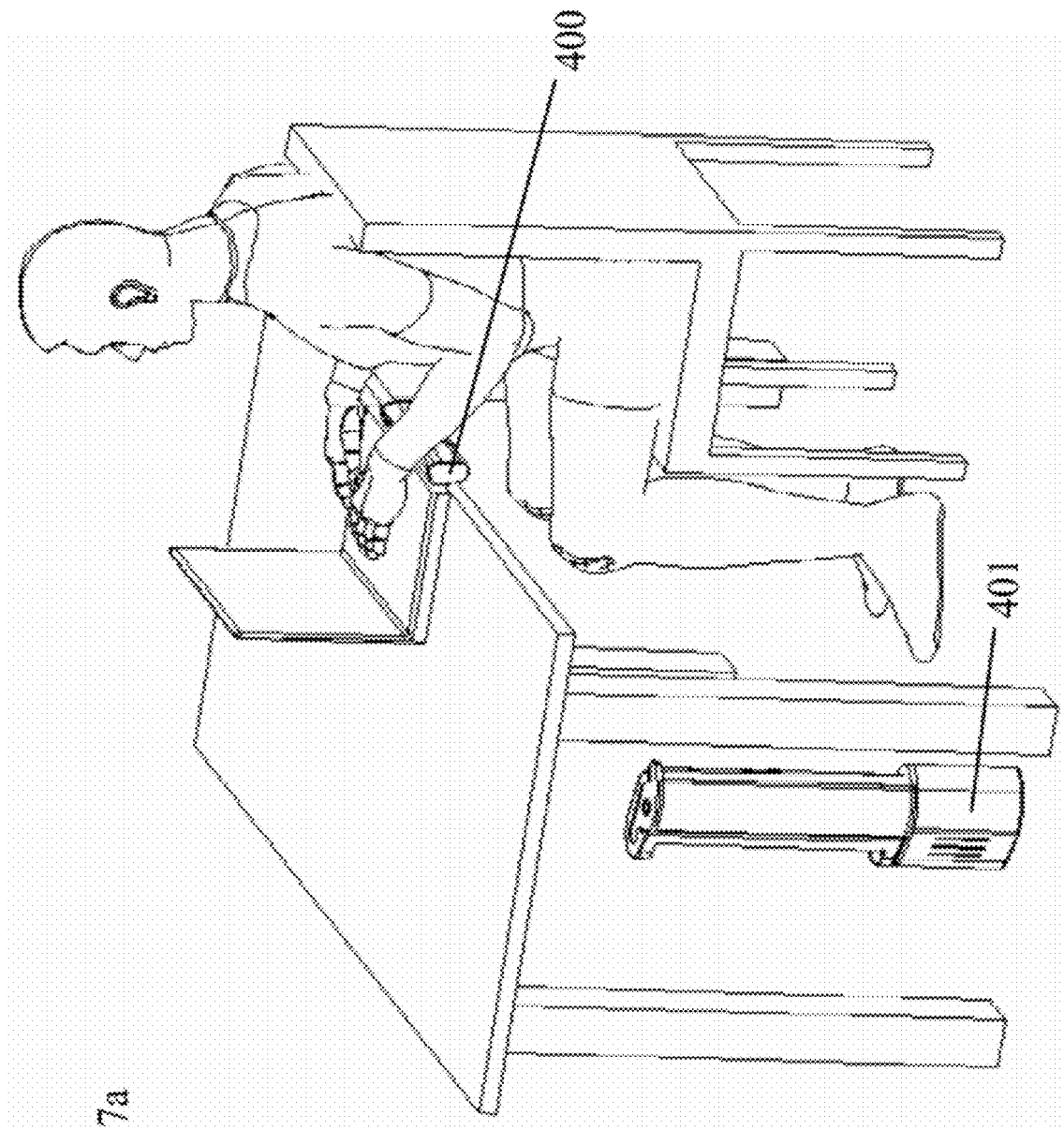
FIG. 17a shows an embodiment where a small personal ventilation device is used in combination with a larger filtration/ventilation device.
Figure 17B:
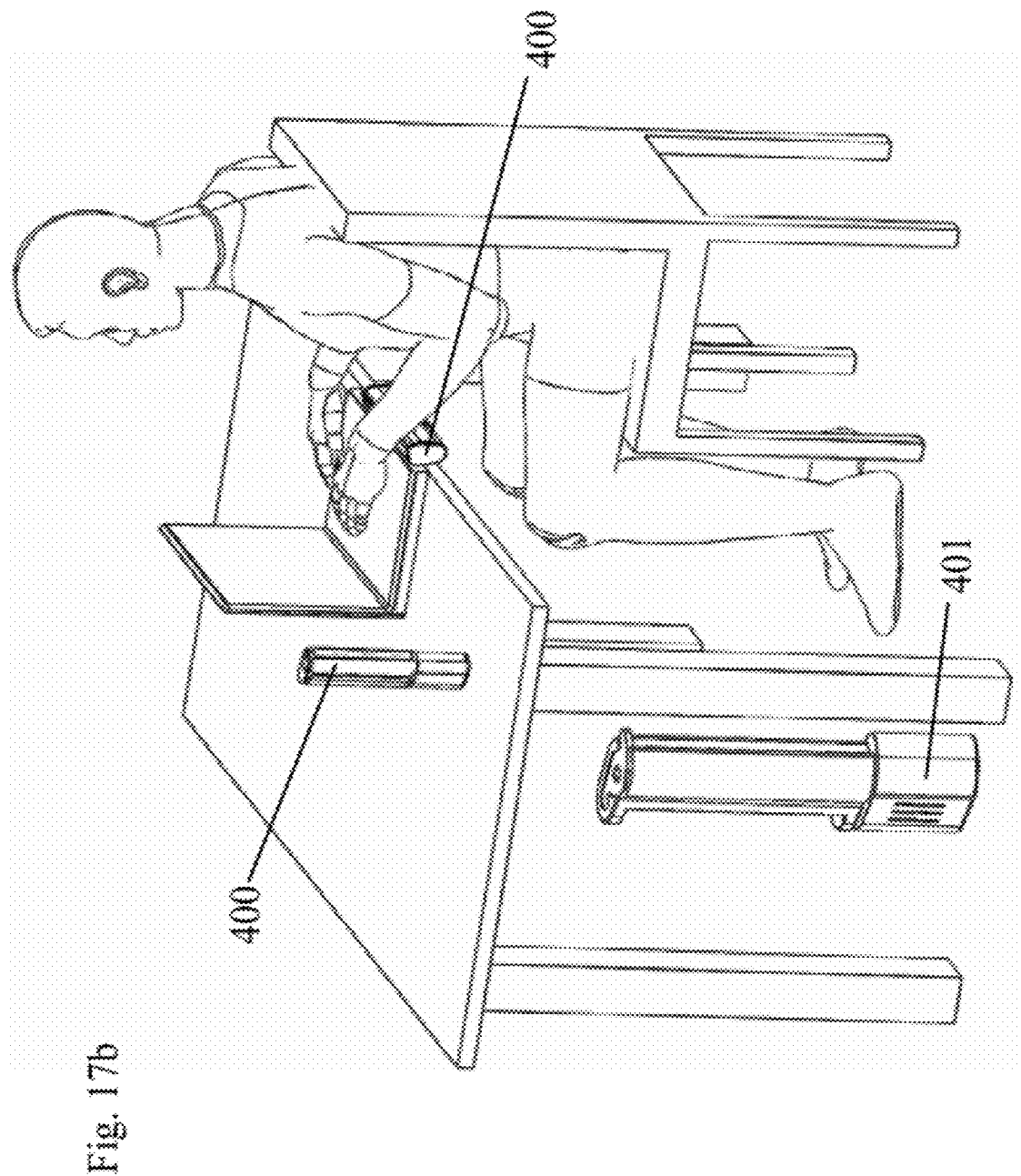
FIG. 17b shows another embodiment where two small personal ventilation devices are used in combination with a larger filtration/ventilation device.

The personal ventilation device unit is readily scalable, while maintaining the same overall shape, for use as a general room air purifier or an under-desk free-standing air purifier. A larger ventilation unit may either be placed on the floor or on a table or shelf for more general air cleaning within a room. This unit filters the air before it enters the user's thermal plume, and can be used either alone, or in combination with one or more of the smaller personal ventilation devices. The overall shape of the unit is the same as the smaller unit, preferably using a cross-flow fan with a J-shaped pleated or unpleated filter. This ventilation device is preferably approximately 3 to 4 times larger than the standard personal ventilation device and easily fits under a user's office desk or on their shelf to pre-filter the air around where it is placed before it is entrained into the user's thermal plume. Examples of the use of both one or more smaller personal ventilation devices 400 and a larger ventilation device 401 are shown in FIGS. 17*a* and 17*b*. Using both one or more small personal ventilation devices 400 to filter the user's thermal plume and one or more larger personal ventilation device 401 to filter a larger area provides an entire personal air purification system for an office or similar environment.

Many commercial applications exist for the personal ventilation system. As discussed above, in one embodiment, the unit will attach directly to a laptop computer or office desk to provide a personal workspace with active filtration. In other embodiments, the device will be wearable in situations where the user is sitting, especially for long periods of time, for example on an airplane, train, or while driving a car during rush-hour traffic. The device will supply fresh air to the individual in these situations, reducing exposure to a wide variety of contaminants. In schools, this system will provide needed relief for children with allergies or asthma. In hospitals, patients, especially those with reduced or compromised immune systems, will benefit from the reduction of inhaled pathogens and other pollutants, which may speed recoveries by reducing secondary infection transmission. For example, the personal ventilation device can be attached to the front of the serving tray on a typical hospital bed to provide a curtain of purified air to the patient.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A ventilation device for filtering contaminants out of air, comprising:
   a) a cross-flow fan comprising a motor, a rotor having plurality of fan blades, and a cover surrounding the rotor and having an inlet and an outlet; and
   b) at least one curved air filter at least partially surrounding the rotor such that air that enters into the ventilation device passes through both the fan and the air filter before exiting the ventilation device;
   wherein at least a portion of the filter comprises a plurality of pleats to increase a surface area of the filter.

2. The ventilation device of claim 1, wherein the pleats are located along a bottom surface of the filter.

3. The ventilation device of claim 1, wherein the filter completely surrounds the rotor such that air that enters the ventilation device passes through the filter at least twice and passes through the fan blades at least twice before exiting the ventilation device.

4. The ventilation device of claim 1, wherein the cover of the cross-flow fan has at least two adjacent axial segments, wherein the cross-flow fan rotates in only one direction and wherein each segment is shaped such that air flows in more than one direction.

5. The ventilation device of claim 1, wherein the ventilation device is a personal ventilation device.

6. The ventilation device of claim 5, further comprising:
   a) a platform for supporting a laptop computer comprising a thermoelectric cooler for cooling the laptop computer and modulating air flow temperature, wherein at least one of the axial segments of the cover of the fan routes air to or from the thermoelectric cooler; and
   b) a power supply for the fan and the thermoelectric cooler.

7. The ventilation device of claim 5, further comprising a bracket for attaching the ventilation device to an object.

8. The ventilation device of claim 5, wherein the device is wearable by an individual.

9. The ventilation device of claim 5, wherein the ventilation device exhausts air out of the device at an exhaust angle between 30 and 45 degrees from horizontal.

10. The ventilation device of claim 5, wherein the ventilation device has an outlet air velocity between 0.5 m/s and 1.0 m/s.

11. The ventilation device of claim 1, wherein the device further comprises a heat exchanger at least partially surrounding the filter.

12. The ventilation device of claim 1, wherein, when the ventilation device is attached to a computer, the computer plays back sounds.

13. The ventilation device of claim 1, further comprising a fragrance dispenser that adds fragrance to air that exits the ventilation device.

14. The ventilation device of claim 1, further comprising a plurality of sensors that monitor temperature and VOC concentration in the air.

15. The ventilation device of claim 1, further comprising a first filter located at the inlet of the fan and a second filter located at the outlet of the fan.

16. The ventilation device of claim 1, wherein at least one filter comprises at least one filter material that targets filtration of a specific contaminant.

17. The ventilation device of claim 1, further comprising a motor controller coupled to the motor and having an input for coupling to an external device that controls the motor.

18. The ventilation device of claim 1, wherein a speed of the fan is pre-programmed such that it is variable.

19. The ventilation device of claim 1, wherein the curved air filter is J-shaped.

20. The ventilation device of claim 1, wherein a rotation speed of the cross-flow fan is continuously modulated.

21. A filtration and ventilation system comprising:
   at least one first ventilation device and at least one second ventilation device for filtering contaminants out of air, wherein the first ventilation device and the second ventilation device each comprise:
      a) a cross-flow fan comprising a motor, a rotor having plurality of fan blades, and a cover surrounding the rotor and having an inlet and an outlet; and
      b) at least one air filter at least partially surrounding the rotor such that air that enters into the ventilation device passes through both the fan and the air filter before exiting the ventilation device;
   wherein the first ventilation device is a personal ventilation device that filters air from a thermal plume of the individual and the second ventilation device is substantially larger than the first ventilation device.

22. The filtration and ventilation system of claim 21, wherein the second ventilation device is approximately at least three times larger than the first ventilation device.

23. A method of filtering contaminants out of air using a personal ventilation device comprising at least one air filter, wherein the personal ventilation device is attached to an inanimate object, comprising the steps of:
   a) drawing air from a thermal plume of a user into the personal ventilation device;
   b) filtering the air using the air filter in the personal ventilation device; and
   c) blowing the filtered air back toward the user.

24. The method of claim 23, wherein the inanimate object is selected from the group consisting of a table, a desk, a serving tray, a steering wheel, a hospital bed and a computer.

25. The method of claim 23, wherein the personal ventilation device is not placed around a neck of the user during the method.

26. The method of claim 23, wherein the device is not worn by the user during the method.

27. The method of claim 23, wherein the personal ventilation device further comprises a cross-flow fan comprising a motor, a rotor having plurality of fan blades, and a cover surrounding the rotor and having an inlet and an outlet; and the air filter comprises at least one air filter at least partially surrounding the rotor such that air that enters into the personal ventilation device passes through both the fan and the air filter before exiting the personal ventilation device.

28. The filtration and ventilation system of claim 21, wherein the air filter in each of the first ventilation device and the second ventilation device is curved.

* * * * *